（12）United States Patent
Miyamoto et al.

(10) Patent No.: US 6,614,737 B2
(45) Date of Patent: Sep. 2, 2003

(54) OPTICAL REPRODUCTION METHOD AND OPTICAL INFORMATION DEVICE

(75) Inventors: Harukazu Miyamoto, Brisbane, CA (US); Hideki Saga, Kokubunji (JP); Seiji Yonezawa, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 26 days.

(21) Appl. No.: 10/076,149

(22) Filed: Feb. 15, 2002

(65) Prior Publication Data

US 2002/0071361 A1 Jun. 13, 2002

Related U.S. Application Data

(63) Continuation of application No. 09/761,185, filed on Jan. 18, 2001, now Pat. No. 6,442,120, which is a continuation of application No. 09/142,023, filed as application No. PCT/JP96/00501 on Mar. 1, 1996, now Pat. No. 6,205,098.

(51) Int. Cl.[7] ................................................ G11B 7/00
(52) U.S. Cl. ..................... 369/53.1; 369/47.5; 369/59.1
(58) Field of Search ............................ 369/47.1, 47.15, 369/47.19, 47.28, 47.5, 47.51, 53.1, 53.12, 59.11, 59.1

(56) References Cited

U.S. PATENT DOCUMENTS

| | | | |
|---|---|---|---|
| 5,005,164 A | * 4/1991 | Sakamoto et al. | 369/116 |
| 5,168,482 A | 12/1992 | Aratani et al. | |
| 5,396,477 A | 3/1995 | Matsumoto et al. | 369/44.28 |
| 5,625,611 A | 4/1997 | Yokota et al. | 369/53 |
| 5,835,469 A | 11/1998 | Maeda et al. | |
| 5,886,969 A | * 3/1999 | Maeda et al. | 369/59.23 |
| 5,982,714 A | 11/1999 | Koda | 369/54 |

FOREIGN PATENT DOCUMENTS

| | | |
|---|---|---|
| EP | 06-56624 | 6/1995 |
| JP | 56-37834 | 4/1981 |
| JP | 3-93056 | 4/1991 |
| JP | 3-93058 | 4/1991 |
| JP | 4-325948 | 11/1992 |
| JP | 4-332919 | 11/1992 |
| JP | 5-225573 | 9/1993 |
| JP | 8-7283 | 1/1996 |
| WO | 95/26548 | 10/1995 |

OTHER PUBLICATIONS

*Patent Abstract of Japan*, vol. 5, No. 92 (P–66), Jun. 16, 1981, for Japanese reference 56–37834 published on Apr. 11, 1981.
*Patent Abstract of Japan*, vol. 17, No. 681 (P–1660), Dec. 14, 1993, for Japanese reference 5–225573 published on Sep. 3, 1993.

* cited by examiner

Primary Examiner—Muhammad Edun
(74) Attorney, Agent, or Firm—Antonelli, Terry, Stout & Kraus, LLP

(57) ABSTRACT

An optical reproduction apparatus includes a light source which irradiates irradiation light onto a recording medium, the irradiation light being reflected by the recording medium to produce reflection light, a modulator which repetitively pulse modulates the irradiation light to produce irradiation light pulses, a photodetector which detects reflection light from the recording medium at more than two timings during each of the irradiation light pulses, and outputs detection signals respectively representative of the reflection light detected at the more than two timings during each of the irradiation light pulses, and an operation circuit which performs an operation between the detection signals outputted from the photodetector during each of the irradiation light pulses.

5 Claims, 6 Drawing Sheets

OPTICAL REPRODUCTION METHOD AND OPTICAL INFORMATION DEVICE

CROSS-REFERENCE TO RELATED APPLICATIONS

This application is a continuation of application Ser. No. 09/761,185 filed on Jan. 18, 2001, now U.S. Pat. No. 6,442,120, which is a continuation of application Ser. No. 09/142,023 filed on Aug. 31, 1998, now U.S. Pat. No. 6,205,098, which is a national stage application under 35 USC 371 of international application No. PCT/JP96/00501 filed on Mar. 1, 1996. The contents of application Ser. Nos. 09/761,185 and 09/142,023 and international application No. PCT/JP96/00501 are hereby incorporated herein by reference in their entirety.

BACKGROUND OF THE INVENTION

1. Field of the Invention

The present invention relates to techniques for optically reproducing information.

2. Description of the Related Art

FIG. 2 shows one exemplary configuration of a magnetooptical recording/reproduction device which is one of prior known optical recording/reproduction devices. Laser light emitted from a laser 311 mounted on an optical head 3 is collimated by a collimator lens 312 into parallel rays of light, which are guided via a beam splitter 324 to a lens 321 that forms a light spot 21 on a magnetooptical recording medium 8. The position of the light spot 21 on the magnetooptical recording medium 8 is controllable by movement of the lens 321 and the optical head 3 under control of a light spot scan control means 63. Reflection light from the magnetooptical recording medium 8 is guided by the beam splitter 324 toward a photodetection means 33. A reproduction signal from the photodetection means 33 is processed by a reproduction circuit 93 for conversion to reproduction data. These overall reproduction operations are under control of a controller 55.

As a method for reproducing information recorded at a high density using the optical recording/reproduction device, a magnetic super-resolution reproduction method is proposed in, for example, Published Unexamined Japanese Patent Application Nos. 3-93058 and 3-93056, which method utilizes a temperature increase within a light spot during reproduction to reproduce information corresponding to such temperature increase part, or to reproduce information of those portions other than the temperature increased part in the light spot.

In this case, certain light of substantially constant intensity is continuously irradiated as the reproduction light. Alternatively, as disclosed in JP-A-56-37834, pulsed light is irradiated at extra high frequencies. With such an arrangement, however, the pulsed light irradiation is effectively equivalent to continuous light irradiation because of the fact that the repeat frequency of such pulses is as high as several hundreds of megahertz or greater so that both the temperature on the optical recording medium and a reproduction output obtainable from reflection light are hardly responsive to a reproduction output of the pulsed light.

SUMMARY OF THE INVENTION

The above-described prior art has a problem of an inability to reproduce any high-density recorded information because of a decrease in effective reproduction signal quality due to the fact that only part of the information of a light spot contributes to reproduction during reproduction of high-density recorded information, thereby reducing the resultant reproduction signal output.

It is therefore an object of the present invention to provide a technique capable of avoiding the problem and of reproducing high-density recorded information at excellently high output with enhanced quality.

To attain the foregoing object, the present invention employs specific means as will be set forth below.

When an optical recording medium is irradiated with light for reproduction of information on the optical recording medium by use of reflection light of the light, light is irradiated intermittently, or alternatively in the form of pulses, and reflection light is detected at at least two time points during irradiation of such intermittent light, thus obtaining a reproduction signal through mutual processing of resultant detection signals.

This makes it possible to detect only a change in reflection light during irradiation of the light, which in turn makes it possible to obtain a high signal output while enabling suppression of those components other than such a change component, thus obtaining a reproduction signal of excellent quality.

Additionally, it is also preferable that reproduction is done while causing the optical recording medium to reversibly change or vary in optical nature by irradiation of intermittent light.

It is thus possible to read, as a signal, only a change component of reflected detection light only at a specific part of the optical recording medium where the optical nature has been altered due to irradiation of intermittent light, which in turn leads to achievement of reproducibility with increased resolution.

Preferably, the reversible change in optical nature of the optical recording medium makes use of a reversible change in optical nature caused by a change in temperature of the optical recording medium due to the intermittent light.

With such an arrangement, a significant change of reflected detection light is obtainable before and after irradiation of the intermittent light, thus obtaining an increased signal output.

It is also preferable that a series of intermittent light pulses may be comprised of at least two light pulses.

The stability of reproduction light is thus improved, obtaining good reproduction signal quality.

The invention provides an optical recording/reproduction device including light irradiation means for irradiating light to an optical recording medium, photodetection means for detecting reflection light of the light, light modulation means for recurrently irradiating light intermittently, first synchronous detection means for detecting an output from the photodetection means in a way synchronized with the intermittent light, second synchronous detection means for detecting an output from the photodetection means at a time point different by a fixed time duration from that of the first synchronous detection means, and processor means for performing operational processing of the outputs of the first synchronous detection means and the second synchronous detection means.

A detection time difference between the first synchronous detection means and the second synchronous detection means may be shorter than a time period of irradiation of the intermittent light.

With these arrangements, it becomes possible to detect only a change component of the reflection light during irradiation of the same intermittent light, thus obtaining a high signal output while enabling suppression of those components other than such a change component, which leads to an ability to obtain a reproduction signal of excellent quality.

The invention provides an optical recording/reproduction device including light irradiation means for irradiating light to an optical recording medium, photodetection means for detecting reflection light of the light, light modulation means for recurrently irradiating light intermittently, delay means for delaying an output from the photodetection means for a predetermined time period, processor means for processing the output delayed by the delay means and the output from the photodetection means, and synchronous detection means for detecting an output from the processor means in a way synchronized with the intermittent light.

The delay time of the delay means may be less than an irradiation time period of the intermittent light.

With these arrangements, it is possible to detect only a change component of the reflection light during irradiation of the intermittent light, thereby obtaining a high signal output while enabling suppression of those components other than such a change component, thus obtaining a reproduction signal of excellent quality.

Further, the intermittent light irradiation time may be shorter than the irradiation interval of the intermittent light.

This makes it possible to establish an appropriate cooling time of the optical recording medium to thereby ensure that a temperature change occurs stably, thus reliably obtaining the intended signal.

It is desirable that the intermittent light irradiation time, Tp, satisfies the following relation:

$$2\text{ nanoseconds} < Tp < D/v/4$$

where D is the size of a light spot as formed on the optical recording medium during reproduction, and v is the velocity or speed of the light spot relative to the optical recording medium.

By setting Tp>2 nanoseconds, it becomes possible to reliably provide a temperature rise of the optical recording medium, thus rendering the signal stably obtainable. In addition, by setting the irradiation time at a time taken for the light spot to move a distance less than or equal to ¼ of the light spot diameter, those components of the reflection light other than the signal components become substantially identical at the instants before and after irradiation of light pulses, thereby making it possible to effectively suppress any unnecessary components.

A differential circuit is usable as the processor means. This makes it possible to detect a signal component alone with unnecessary components suppressed, thus obtaining excellent reproduction signal quality.

An operation of the present invention will be explained with reference to FIG. 5.

FIG. 5(c) shows an example of intermittent light 501 to be irradiated in the present invention. Due to the thermal action of the irradiation light, a temperature distribution 502 on an optical recording medium varies as shown in FIG. 5(b). Here, the medium used herein may be the one as taught by JP-A-3-93056, for example, which changes in optical nature at or above a certain temperature (referred to as a "mask formation temperature") and renders effectively "invisible" (or masks) the information recorded on the medium (recording magnetic domains).

FIG. 5(a) is a diagram for comparing the visibility of the information on the optical recording medium at a time point immediately after beginning of light irradiation with that at a time point immediately prior to completion of the light irradiation. In the state 92 just before completion of the light irradiation, a significant change is observable at the center of a light spot between the light irradiation beginning just-after state 91 and the light irradiation completion just-before state 92. This is because a mask is formed at the light spot center due to an increase in temperature. Then, by processing the reproduction signals resulting from these two states, it is possible to detect only a change component between such two states. Here, one example is shown wherein differential processing is done by a differential detector 503.

At this time, since the light spot is slightly moved between the state 91 and the state 92, a change might also be observable in a signal from a low temperature part. However, as long as such movement remains less than or equal to ¼ the light spot diameter, such a change is not optically resolvable, so that any signal change at a low temperature part will be negligible in practical use.

DETAILED DESCRIPTION OF THE INVENTION

Some preferred embodiments of the present invention will be described below along with a detailed explanation of the principle and the operation of the present invention as well as effects thereof.

<<Embodiment 1>>

Figure 3:
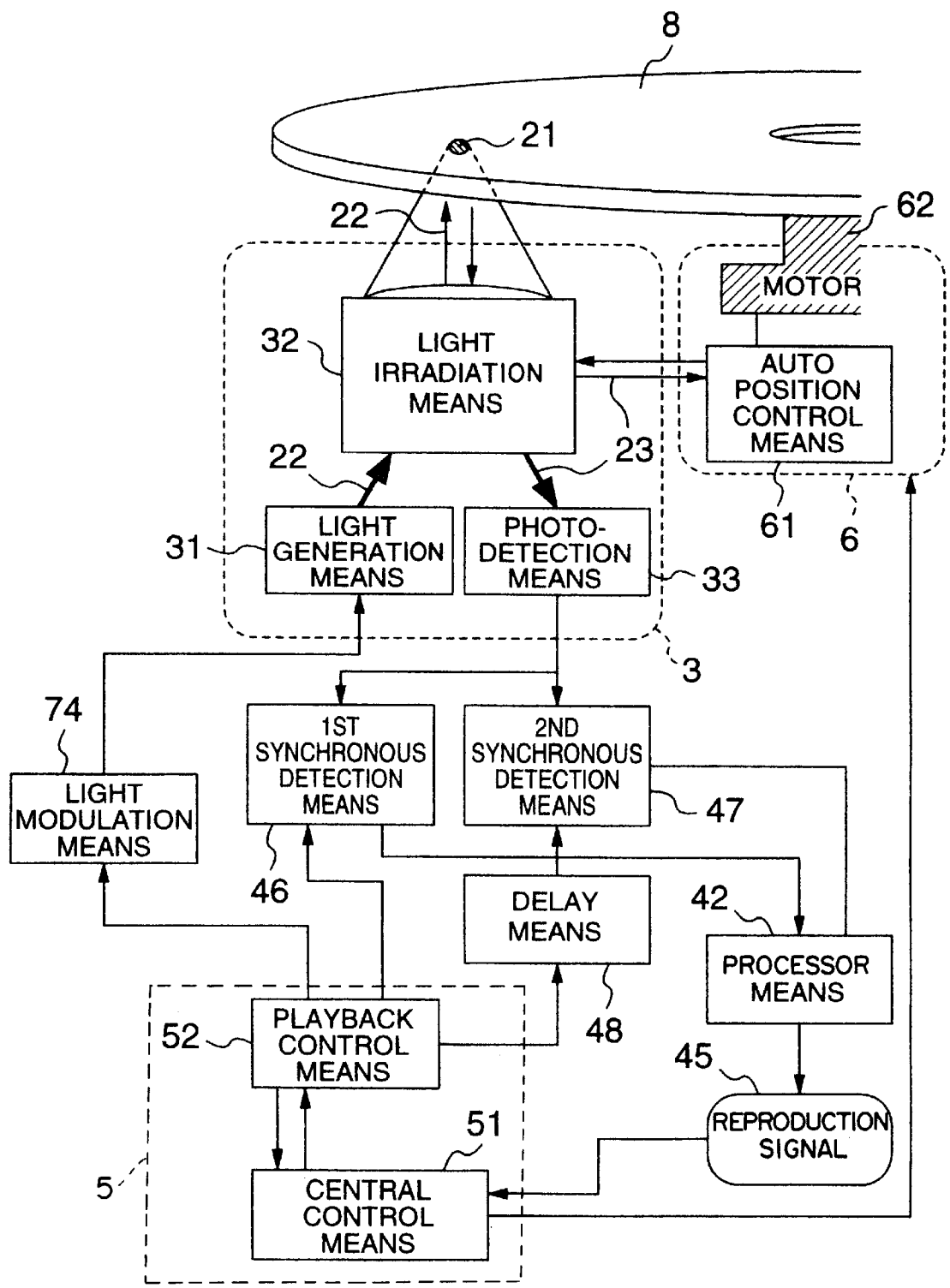
FIG. 3 is a block diagram of one embodiment of an optical recording/reproduction device of the present invention.

One exemplary configuration of an optical recording/reproduction device of the present invention is shown in FIG. 3. In the illustrative embodiment, a semiconductor laser of 680 nm wavelength is employed as a light generation means 31. The semiconductor laser is controlled in intensity by a light modulation means 74 for intermittent irradiation. The light generation means 31 emits light 22, which is collected by a light irradiation means 32 to be focused on the optical recording medium 8. In this example, the light irradiation means 32 consists essentially of at least one lens. The aperture ratio of an objective lens for use in collecting light onto the optical recording medium 8 is set at 0.55. Due to this, the resultant light spot 21 on the optical recording medium 8 is 1.1 μm in diameter.

The light spot 21 is controlled by a scan means 6 under control of a central control means 51 included in a controller 5 so that the light spot 21 is movable to a given position on the optical recording medium 8. In this embodiment, the scan means 6 includes a motor 62 for rotation of the disk-shaped optical recording medium 8, and an automatic position control means 61 with automatic focusing control and automatic tracking functionality. The automatic position control means 61 performs feedback control by utilizing reflection light 23 from the optical recording medium 8. In this example, the reflection light 23 from the light spot 21 is guided by a polarized light beam splitter provided in the light irradiation means 32 toward a photodetection means 33. The photodetection means 33 is comprised of a polarized light analyzer means, such as a light polarizer, and a photodetector device for converting light into a corresponding electrical signal.

In the illustrative embodiment, the intensity of light being irradiated during reproduction of information is intensity-controlled by the light modulation means 74 to thereby provide intermittent light that provides irradiation for 3 nanoseconds and pauses for 18 nanoseconds at the innermost disk periphery (the linear velocity is about 10 m/s). This irradiation period is substantially inversely proportional to the linear velocity. One exemplary intermittent light is such that a 3-nanosecond irradiation and a 7-nanosecond pause are provided at the outermost disk periphery (the linear velocity is about 20 m/s). In this example, the irradiation time (3 nanoseconds) is designed to remain constant irrespective of the linear velocity. This allows the optical recording medium 8 to be kept almost constant in peak temperature thereof during reproduction, thereby enabling effectuation of the intended reproduction under the same condition with respect to the inner and outer disk peripheries.

In this embodiment, the "sample servo" scheme is employed to match the timing of light irradiation with optically recorded information on the medium. More specifically, clock markings or "marks" for use in generating clocks are preformed on the disk with a predefined distance or interval defined between adjacent ones of such marks. During reproduction, the intermittent light is irradiated in a way synchronized to such reproduced clocks obtainable by multiplication of a reproduction signal from these clock marks. Generation of this timing is performed by a reproduction control means 52 included in the controller 5 under control of the central control means 51. In this example, there is a smaller change in that reflected light coming from certain portions of the disk other than the portion at which the optical nature of the disk is changed by reproduction light before and after light irradiation because the light spot's travel distance on the disk during light irradiation is 0.03 μm at the inner periphery and 0.06 μm at the outer periphery, each of which is sufficiently smaller than ¼ of the diameter of 1.1 μm of the light spot 21.

The resulting electrical signal converted by the photodetection means 33 is supplied to a first synchronous detection means 46 and a second synchronous detection means 47, which are operable to detect therefrom a reflection light output immediately after beginning of irradiation of the intermittent light (after elapse of about 0.5 ns from the beginning of irradiation) in response to a control signal from the reproduction control means 52, and immediately prior to completion of such irradiation (after elapse of about 2.5 ns from the beginning of irradiation) in response to a control signal from the reproduction control means 52 which is delayed by a delay means 48. These two detected signals are inputted to a processor means 42 which performs mutual operational processing between them, obtaining a reproduction signal 45. Note that while the operational processing employed herein is principally a differential operation, it is desirable that slight gain adjustment is done between the two detected signals in view of possible deterioration of the frequency characteristics in the reproduction system.

Figure 5:
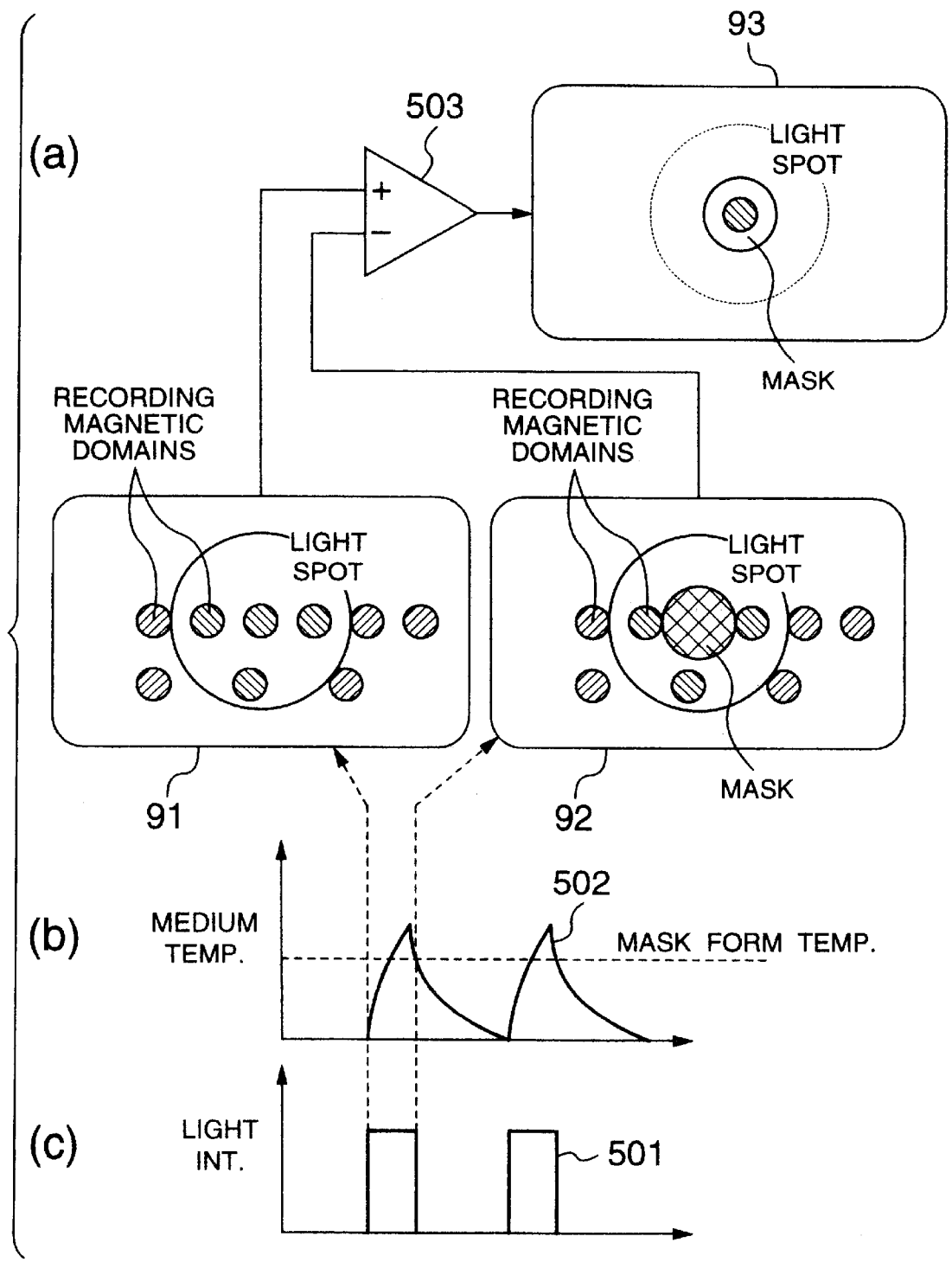
FIG. 5 is a diagram showing the principle of the present invention.

In the illustrative embodiment, a medium of the magnetic super-resolution type is used as the optical recording medium 8, which has a three-layer lamination of magnetic films made of TbFeCo, DyFeCo, and GdFeCo. This medium stores information in the TbFeCo recording layer in the form of recording magnetic domains, wherein at room temperature the magnetic domains of the TbFeCo recording layer are transferred to the GdFeCo playback layer via the DyFeCo intermediate layer, thereby enabling the information to be read out of the playback layer side. On the other hand, at high temperatures, magnetization of the DyFeCo intermediate layer can disappear, causing magnetic domains of the GdFeCo playback layer to likewise disappear due to action of a bias magnetic field created during reproduction. Accordingly, when looking at this medium from the playback layer side, this medium behaves to let the Kerr rotation angle be zero at high temperatures. In other words, the optical nature can change or vary at high temperatures. For this reason, applying the optical recording medium of this type to the illustrative embodiment makes it possible to detect only a changed part or component of a high-temperature portion at the light spot center between the state 91 immediately after beginning of light irradiation and the state 92 just before completion of such light irradiation as shown in FIG. 5, which in turn enables successful provision of the intended reproduction signal that is high in resolution and excellent in quality.

Figure 4:
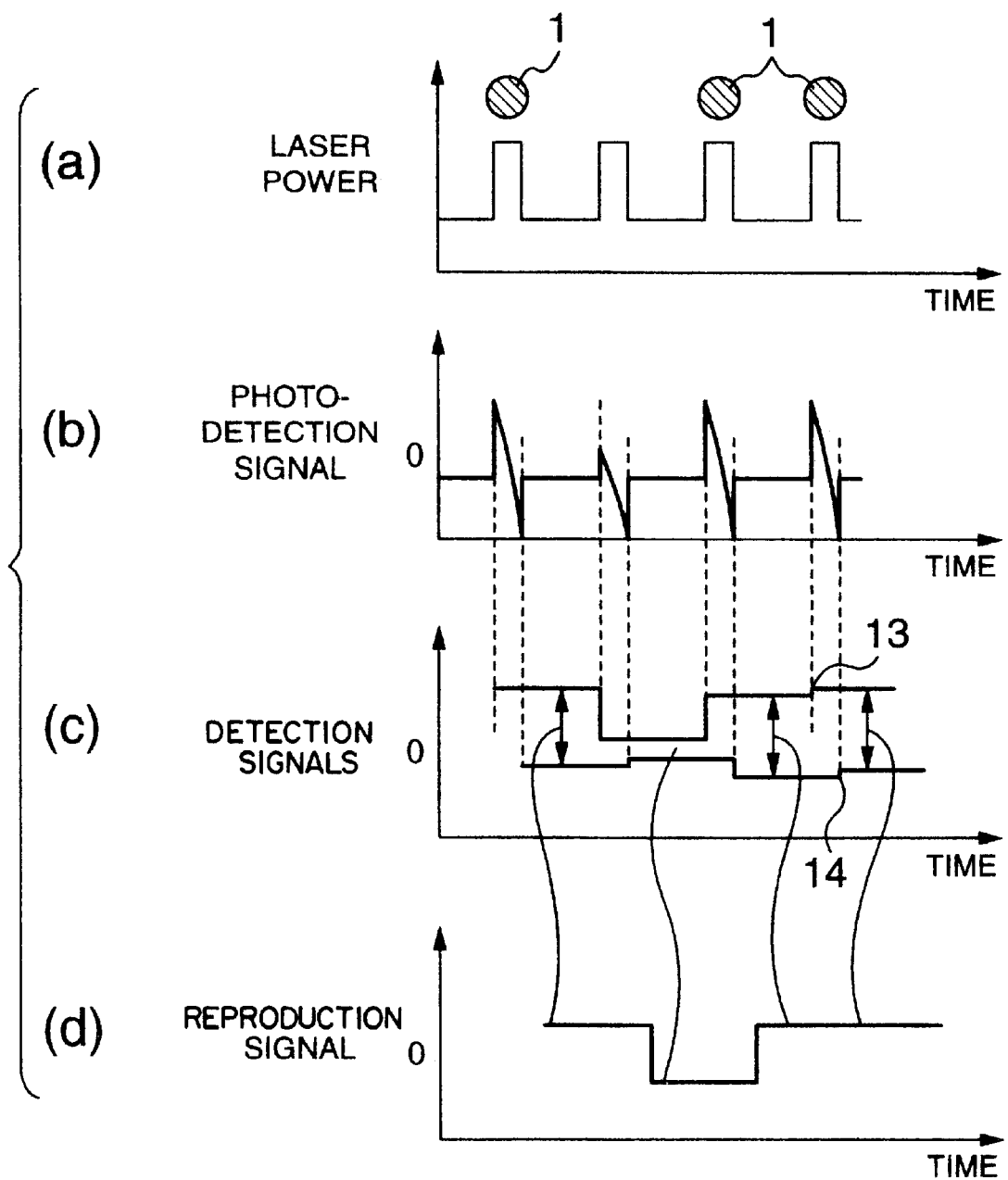
FIG. 4 is a waveform diagram showing an operation principle of one embodiment of an optical recording/reproduction device of the present invention.

An operation of the present invention will be explained in more detail with reference to FIG. 4 below. When irradiating intermittent light upon a certain part of the medium where recording magnetic domains exist in the manner as shown in FIG. 4(a), a photodetection signal obtained has the waveform shown in FIG. 4(b). A rightward ramp-down signal change shown in FIG. 4(b) may reflect the manner that the dimension or size of a mask varies with a change in temperature on the medium. When detecting from such a signal both a detection signal just after the light irradiation beginning and a detection signal just before the light irradiation completion by use of the device shown in FIG. 3, detection signals are obtainable as shown in FIG. 4(c). By applying differential operational processing to these detection signals, a reproduction signal may be obtained as shown in FIG. 4(d).

At this time, the signal output is variable, and step-like differences 13, 14 are observed in the resulting detection signals of FIG. 4(c). However, such step-like differences disappear in FIG. 4(d). This is because various kinds of noise components occurring due to reproduction signals obtained from portions other than the mask portion are canceled out through the differential operational processing. Thus, signal quality enhancement is achievable.

When using the device of the present invention to reproduce 0.2 μm long magnetic domains recorded by magnetic field modulation techniques, presence and absence of such recording magnetic domains could be identified for reproduction at an error rate of approximately 2/100000. More specifically, 0.2 μm/bit high-density recording was attainable. Furthermore, even when reproduction of magnetic domains recorded at a track pitch of 0.5 μm was carried out using the device of the present invention, no particular increase was seen in the error rate. In other words, narrow track reproduction with 0.5 μm track pitch was enabled.

In summary, use of the device embodying the present invention enabled achievement of high-density recording of 6.4 gigabits per square inch.

<<Embodiment 2>>

Figure 1:
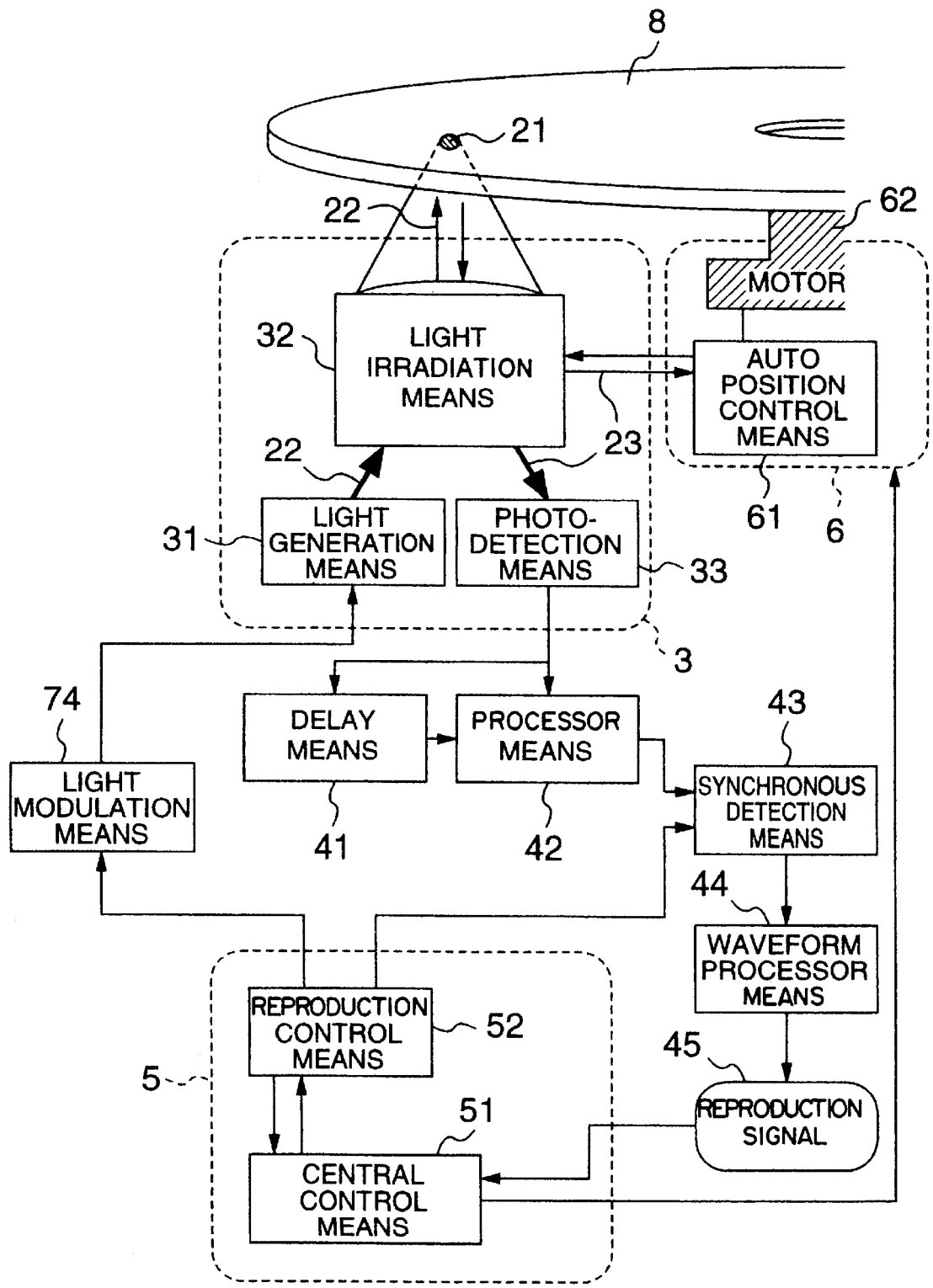
FIG. 1 is a block diagram of one embodiment of an optical recording/reproduction device of the present invention.
Figure 2:
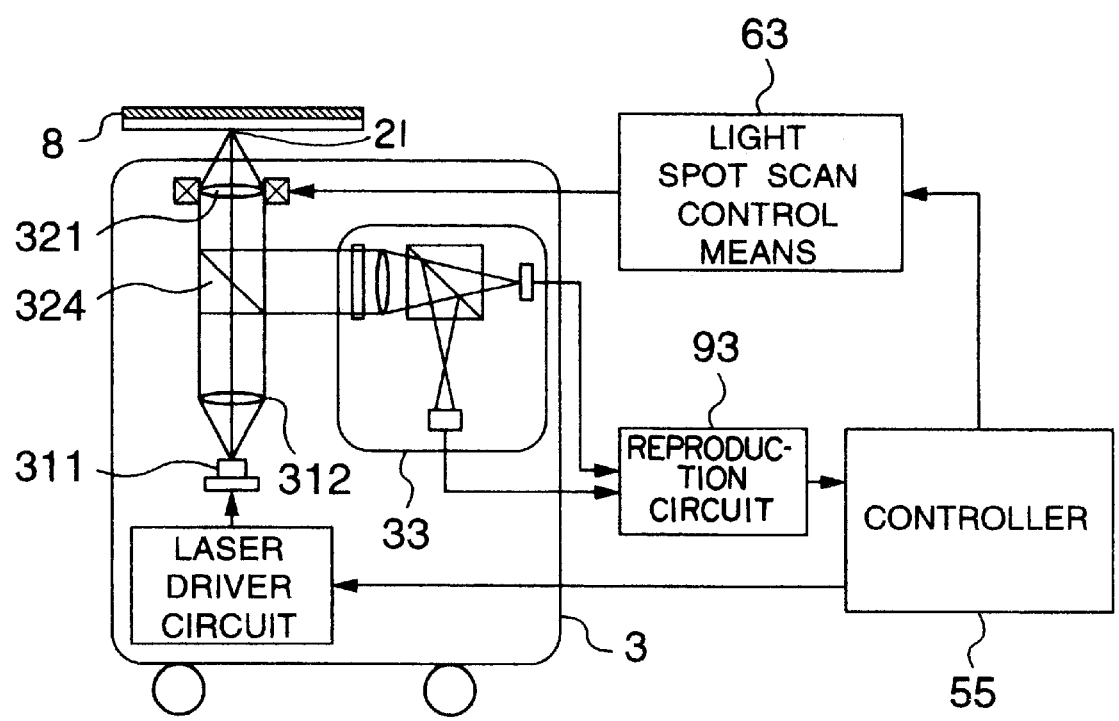
FIG. 2 is a diagram showing a configuration of one typical prior-art optical recording/reproduction device.

An example of a configuration of an optical recording/reproduction device of the present invention is depicted in FIG. 1. In this embodiment, a semiconductor laser of 680 nm wavelength is employed as a light generation means 31. The intensity of the semiconductor laser is controllable by a light modulation means 74. Light 22 emitted from the light generation means 31 is collected by a light irradiation means 32 to be focused on an optical recording medium 8. In this example, the light irradiation means 32 consists essentially of at least one lens. In this example, an objective lens for use in collecting light onto the optical recording medium 8 has an aperture ratio of 0.6. Accordingly, a light spot 21 on the optical recording medium 8 is 1.0 μm in diameter. The light spot 21 is movable to a given position on the optical recording medium 8 under control of a scan means 6 under control of a central control means 51 included in a controller 5. In this example, reflection light 23 from the light spot 21 is guided toward a photodetection means 33 by a polarized light beam splitter provided in the light irradiation means 32. The photodetection means 33 includes a polarized light analyzer means such as, for example, a light polarizer, and a photodetector device for converting light to an electrical signal.

In the illustrative embodiment, the intensity of light being irradiated during reproduction of information is controlled by a light modulation means 74 under control of a reproduction control means 52 included in the controller 5 under control of the central control means 51, thereby providing intermittent light of 4-nanosecond irradiation/6-nanosecond pause. In this embodiment, constant linear velocity control techniques, such as CLV, ZCLV, and the like, are employed to ensure that the disk's linear velocity is constantly kept at 5 m/s. Accordingly, light is irradiated every time the light spot 21 moves a distance of about 0.05 μgm, and during light irradiation, the light spot 21 travels about 0.02 μm. These travel distance values are sufficiently smaller than the diameter of 1.0 μm of the light spot 21.

An electrical signal converted by the photodetection means 33 is subdivided into two portions, one of which is delayed by a delay means 41 for approximately 2.5 ns and is then subjected to differential operational processing with the other one in a processor means 42. In this case also, while the processing is basically differential operational processing, it is desirable that gain adjustment is done between the two detected signals to take into account any possible deterioration of the reproduction system's frequency characteristics. Of those processed outputs, only one or ones originating from the processing of signals during light irradiation are synchronously detected by a synchronous detection means 43 in response to a control signal from the reproduction control means 52, and are then inputted to a waveform processor means 44 such as, for example, a low-pass filter, thereby obtaining a reproduction signal 45.

In this embodiment, the optical recording medium 8 used is a magnetooptical recording medium having a two-layer lamination of magnetic films made of TbFeCo and GdFeCo. This medium stores, in its TbFeCo recording layer, information in the form of recording magnetic domains, wherein the magnetic domains of the TbFeCo recording layer are transferred to the GdFeCo playback layer at room temperature, thus enabling information to be read from the playback layer side. On the other hand, at high temperatures, approach to the GdFeCo playback layer's Curie temperature causes the Kerr rotation angle to decrease. In other words, the optical nature can change or vary at high temperatures. Consequently, applying this optical recording medium to the device embodying the present invention leads to an ability to detect only a changed part of a high temperature portion at the light spot center between the light irradiation beginning just-after state 91 and the light irradiation completion just-before state 92 as shown in FIG. 5, which in turn renders obtainable the intended reproduction signal high in resolution and excellent in quality. The magnetooptical recording medium used in this embodiment has a feature in that it does not require any bias magnetic field during reproduction.

When using this embodiment device to reproduce 1–7 modulation-recorded magnetic domains of 0.24 μm in length which have been recorded on the medium by light modulation techniques using divided pulses, it was possible to identify for reproduction the presence and absence of recorded magnetic domains at a reduced error rate of approximately 2/100000. This may be reworded in a way such that a high linear density recording of 0.18 μm per bit was enabled. Further, even where the device embodying the present invention is used to perform reproduction of certain magnetic domains that have been simultaneously recorded at both grooves and intergroove lands, each of which has a width of 0.6 μm, no particular increase in the error rate was observed. This well demonstrates that 0.6 μm narrow track pitch reproduction was achieved.

It may thus be summarized that the use of the device embodying the invention enabled high-density recording of about 6 gigabits per square inch.

<<Embodiment 3>>

An explanation will now be given of another example of an optical recording/reproduction device in accordance with the present invention. The basic block form of the device may be similar to that shown in FIG. 1, and accordingly a characteristic part thereof will be explained in conjunction with FIG. 1.

Figure 6:
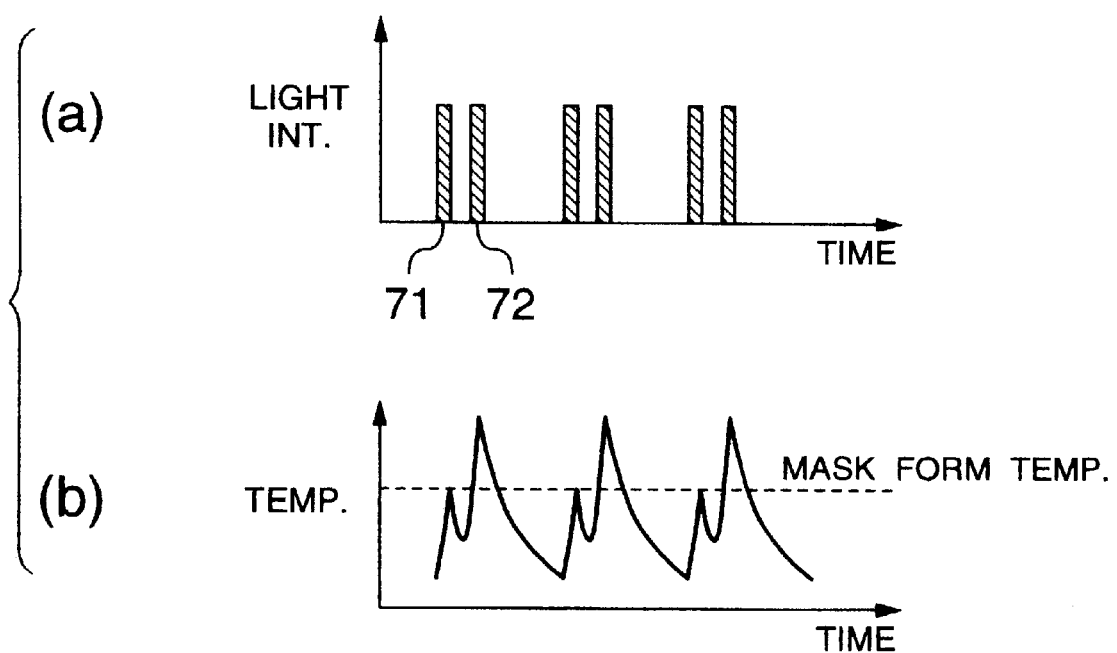
FIG. 6 is a waveform diagram showing the operation principle of one embodiment of an optical recording/reproduction device of the present invention.

In this embodiment, divided pulse light as shown in FIG. 6 is employed as the intermittent light. More specifically, light irradiation is done so that two light pulses 71, 72, each 1 nanosecond wide, are irradiated with a period of 2.5 nanoseconds, and then an intermission is provided for a time period corresponding to the widths of two pulses. Thus, the total period as a whole is 10 nanoseconds. In this embodiment, constant linear velocity control techniques, such as CLV, ZCLV, and the like, are employed to ensure that the disk's linear velocity is kept constantly at about 5 m/s. With such an arrangement, light is irradiated every time the light spot 21 moves a distance of about 0.0125 μm. The travel distance remains sufficiently less than the diameter of the light spot 21.

An electrical signal converted by the photodetection means 33 is divided into two portions, one of which is delayed by the delay means 41 for about 2.5 ns and is then subjected in the processor means 42 to differential operational processing with the other one. At this stage also, while the processing used herein is basically differential operational processing, it is desirable that gain adjustment is done between the two detected signals to take into account any possible deterioration of the reproduction system's frequency characteristics. Of those resulting processed outputs, only one or ones originating from the processing of signals during light irradiation are synchronously detected by the synchronous detection means 43 in response to the control signal from the reproduction control means 52, and are then supplied to the waveform processor means 44 such as, for example, a low-pass filter, thus obtaining the reproduction signal 45.

In the illustrative embodiment, a specified medium of the phase-change super-resolution type is employed as the optical recording medium, which has a phase-changeable film and stores information based on a surface configuration. When this embodiment device was used to reproduce bit edge recorded marks that have been recorded by 2–7 modulation techniques to measure 0.24 µm in minimum length, the intended reproduction was accomplished at a reduced error rate of approximately 2/100000. It was thus possible to achieve 0.16 µm/bit high linear density recording. Further, when narrow track reproduction of 0.7 µm track pitch was done using the device of the invention, high density recording of about 6 gigabits per square inch was enabled.

It is noted that the optical recording medium employable in the present invention should not exclusively be limited to the magnetooptical recording medium using the multilayer film structure or the phase-changeable film, or to a single-layer magnetooptical recording medium, but that any other media may be employed which are changeable in optical nature at light irradiation portions thereof by utilization of a temperature rise or the like on the media, such, as for example, those media containing therein organic pigments or the like. In such cases also, the advantages unique to the invention are still obtainable.

According to the present invention, a reproduction signal is obtainable by intermittently irradiating light to an optical recording medium of the type which changes or alters in optical nature due to irradiation of light and by performing mutual operational processing of those signals that are obtained by detection of reflection light at at least two time points during irradiation of such intermittent light. With such an arrangement, it is possible to successfully detect only the "pure" signal components at portions where the reflection light has changed due to irradiation of light during the intermittent light irradiation, thereby enabling reproduction of any fine or "micro" recorded information with enhanced resolution while simultaneously enabling suppression of those components other than such change components, which in turn leads to an ability to obtain a reproduction signal excellent in quality.

What is claimed is:

1. An optical reproduction apparatus comprising:

a light source which irradiates irradiation light onto a recording medium, the irradiation light being reflected by the recording medium to produce reflection light;

a modulator which repetitively pulse modulates the irradiation light to produce irradiation light pulses;

a photodetector which detects reflection light from the recording medium at more than two timings during each of the irradiation light pulses, and outputs detection signals respectively representative of the reflection light detected at the more than two timings during each of the irradiation light pulses; and an operation circuit which performs an operation between the detection signals outputted from the photodetector during each of the irradiation light pulses.

2. An optical reproduction apparatus according to claim 1, wherein the operation circuit includes a differential circuit.

3. An optical reproduction apparatus according to claim 1, wherein the more than two timings include a timing immediately after a beginning of each of the irradiation light pulses and a timing immediately before an end of each of the irradiation light pulses.

4. An optical reproduction apparatus according to claim 1, wherein the recording medium includes a magnetic recording film.

5. An optical reproduction apparatus comprising:

a light source which irradiates irradiation light onto a recording medium to form a light spot on the recording medium, the light spot increasing a temperature of the recording medium within the light spot such that a temperature of the recording medium within a central portion of the light spot is higher than a temperature of the recording medium within a peripheral portion of the light spot;

a modulator which repetitively pulse modulates the irradiation light to produce irradiation light pulses; and a detector which detects a variation in the temperature of the recording medium within the central portion of the light spot during each of the irradiation light pulses.

* * * * *